United States Patent
Yu et al.

(10) Patent No.: US 12,400,052 B2
(45) Date of Patent: Aug. 26, 2025

(54) NEAR SPACE ATMOSPHERIC STATE SIMULATION METHOD AND DEVICE BASED ON QUANTUM WALK

(71) Applicant: NANJING NORMAL UNIVERSITY, Nanjing (CN)

(72) Inventors: Zhaoyuan Yu, Nanjing (CN); Xu Hu, Nanjing (CN); Wen Luo, Nanjing (CN); Linwang Yuan, Nanjing (CN); Binru Zhao, Nanjing (CN)

(73) Assignee: NANJING NORMAL UNIVERSITY, Nanjing (CN)

( * ) Notice: Subject to any disclaimer, the term of this patent is extended or adjusted under 35 U.S.C. 154(b) by 80 days.

(21) Appl. No.: 17/790,346

(22) PCT Filed: Aug. 19, 2021

(86) PCT No.: PCT/CN2021/113385
§ 371 (c)(1),
(2) Date: Jun. 30, 2022

(87) PCT Pub. No.: WO2023/015588
PCT Pub. Date: Feb. 16, 2023

(65) Prior Publication Data
US 2024/0176925 A1 May 30, 2024

(30) Foreign Application Priority Data
Aug. 10, 2021 (CN) .......................... 202110912690.8

(51) Int. Cl.
*G06F 30/20* (2020.01)
(52) U.S. Cl.
CPC .................... *G06F 30/20* (2020.01)
(58) Field of Classification Search
CPC ...... G06F 30/20; G06F 2111/10; G06F 30/25; G06F 30/27; G06F 30/28; G06F 2111/04;
(Continued)

(56) References Cited

U.S. PATENT DOCUMENTS

2012/0303278 A1 11/2012 Dannevik et al.
2016/0347482 A1* 12/2016 Dimpfl ..................... B64G 3/00

FOREIGN PATENT DOCUMENTS

CN 106525651 A 3/2017
CN 112614336 A 4/2021
(Continued)

OTHER PUBLICATIONS

Li D, Yu Z, Wu F, Luo W, Hu Y, Yuan L. The tensor-based feature analysis of spatiotemporal field data with heterogeneity. Earth and Space Science. Feb. 2020;7(2):e2019EA001037. (Year: 2020).*

(Continued)

*Primary Examiner* — Chuen-Meei Gan
(74) *Attorney, Agent, or Firm* — CBM PATENT CONSULTING, LLC

(57) ABSTRACT

A near space atmospheric state simulation method and device based on the quantum walk comprises: firstly, based on a characteristic of a near space atmosphere changing along with latitude, dividing a study region into a plurality of bands according to the latitude; secondly, based on a one-dimensional topology network constructed by the bands, simulating interaction and transfer processes of gas molecules between the bands by quantum walk to obtain all possible near space atmospheric evolution models; then, screening for actually existing evolution models in each of the bands based on stepwise regression by taking observed atmospheric density data as constraint conditions; and finally, constructing a mapping mechanism between a plurality of near space atmospheric evolution models and atmospheric density parameter values to achieve simulation and optimization of near space atmospheric states.

6 Claims, 2 Drawing Sheets

(58) Field of Classification Search
CPC .. G06F 2113/08; G06F 2119/14; Y02A 90/10; G06N 10/00

See application file for complete search history.

(56) References Cited

FOREIGN PATENT DOCUMENTS

| | | |
|---|---|---|
| CN | 112800603 A | 5/2021 |
| JP | 2013156796 A | 8/2013 |

OTHER PUBLICATIONS

Yuke ZH. Characterizing the spatio-temporal dynamics and variability in climate extremes over the Tibetan plateau during 1960-2012. Journal of Resources and Ecology. Aug. 2019;10(4):397-414. (Year: 2019).*

Zengjie Wang et al., Query the trajectory based on the precise track: a Bloom filter-based approach Geoinformatica ., col. 25, Issue 2, p. 397-416 Publication date: Mar. 15, 2021.

* cited by examiner

NEAR SPACE ATMOSPHERIC STATE SIMULATION METHOD AND DEVICE BASED ON QUANTUM WALK

CROSS REFERENCES

This application is the continuation application of International Application No. PCT/CN2021/113385 filed on 19 Aug. 2021 which designated the U.S. and claims priority to Chinese Application No. CN202110912690.8 filed on 10 Aug. 2021, the entire contents of each of which are hereby incorporated by reference.

TECHNICAL FIELD

The present invention relates to the fields of atmospheric sciences and quantum theory, and particularly relates to near space atmospheric state simulation method and device based on the quantum walk.

BACKGROUND

As a transition zone between a high-density atmosphere and a low-density atmosphere, the near space covers complex space environment processes, atmospheric activities, and various physical and chemical processes, so that it has complex time and space scale changes, and has an important impact on human life and climate change. However, the sparse distribution of the existing observation data for the near space atmosphere makes it difficult to reflect the spatial and temporal distribution structure and evolutionary characteristics of the near space atmosphere in a comprehensive and detailed way. Therefore, it is helpful, for the exploration of the evolution characteristics and the diffusion mechanism of the near space atmosphere, to invert the evolution models of the near space atmosphere under the support of limited observation data based on the idea of simulation, which would be of great value to further development and utilization of the near space.

Atmospheric models are important approaches for the simulation of the near space atmosphere. At present, the widely used atmospheric models mainly include three types, namely a standard atmospheric model, a reference atmospheric model, and a numerical model. The standard atmospheric model abstracts the near space atmosphere as an idealized and steady-state gas/fluid, and simulates the theoretical values of the global or regional atmosphere under ideal environmental conditions based on the ideal gas law/hydrostatic equation. Typical standard atmospheric models include the U.S. Standard Atmosphere 1962, the U.S. Standard Atmosphere supplement 1966, and the U.S. Standard Atmosphere 1976. Although the standard atmospheric model can reflect the general trend of atmospheric parameters under a steady-state condition, it is difficult for the standard atmospheric model to achieve accurate simulation and characteristic analysis of the near space because of the high approximation of empirical parameters or average state parameters to atmospheric parameters. The reference atmospheric model (empirical atmospheric model) is an empirical model established by using the atmosphere theory and atmospheric sounding data, and can describe the vertical distribution of atmospheric parameters in a specific geographic location or region or globally. Representative reference atmospheric models include the COSPAR International Reference Atmosphere (CIRA) series, mass spectrometer and incoherent scatter radar (MSIS) series, and horizontal wind model (HWM) series. Generally, the numerical approximation and data assimilation are performed by the reference atmospheric model with atmospheric sounding data as auxiliary data to achieve the simulation of atmospheric parameters in the near space. Due to the complex change rules and strong local characteristics of the near space atmosphere, the simulation results of the existing reference atmospheric model differ greatly from the actually measured data, so the demand for refined atmosphere simulation is difficult to meet. The numerical model is a model based on the atmospheric general circulation model framework, which integrates the basic characteristics of atmospheric motion and various physicochemical processes, and simulates atmospheric parameters more accurately according to the control of inputs and the selection of parameterization schemes. The numerical model is commonly used for the principle exploration of the physicochemical phenomena of the middle and upper atmosphere. At present, common atmospheric numerical models include the Canadian middle atmosphere model (CMAM), global thermosphere-ionosphere-mesosphere-electrodynamics general circulation model (TIME-GCM), whole atmosphere community climate model (WACCM), etc. Even if the numerical model can obtain better simulation results, the expansion and application of the model are limited by the complexity of parameters, the high computational overhead and the strong dependence of simulation results on input parameters and the parameter calibration process. In addition, some studies have shown that when extreme weather occurs, the simulation error of existing atmospheric models can reach 100% or even higher, which indicates that those atmospheric models are sensitive to abnormal events and difficult to timely respond to sudden atmospheric changes caused by the abnormal events.

Further, some scholars have developed near space atmosphere simulation models based on the idea of parameter correction and inversion, and the near space atmosphere simulation models can be classified as the linear model and the nonlinear model. For example, Miao Juan et al proposed a correction method based on real-time atmospheric density observation data based on detected data from the Shenzhou spacecraft. Combined with calibrated MSIS model and the solar and geomagnetic activity indexes, Chang Xinzhuo et al constructed an adaptive regression neural network (NARX) atmospheric density prediction model, which provides an idea for improving the accuracy of short-term orbit prediction for low earth orbit satellites.

In summary, the above atmosphere simulation models simulate the near space atmosphere from a deterministic perspective, while ignoring the original characteristics of atmosphere evolution, i.e., the random diffusion and interaction of gas molecules. As a result, it is difficult for those models to strike a balance between simulation accuracy and computational complexity. A feasible method is to model the random diffusion process of near space atmospheric molecules from a non-deterministic perspective, and construct the mapping relationship between the near space atmospheric parameters and the atmospheric evolution models under constraints of simulation accuracy and computational data, so as to achieve the dynamic simulation of the near space atmospheric parameters.

SUMMARY

Objective: the present invention provides a near space atmospheric state simulation method based on the quantum walk, which achieves dynamic simulation of near space atmospheric parameters while well balancing simulation accuracy and computational complexity.

Technical scheme: the present invention provides a near space atmospheric state simulation method based on the quantum walk, which specifically comprises the following steps:
(1) based on a characteristic of a near space atmosphere changing along with latitude, dividing a study region into a plurality of bands according to the latitude;
(2) based on a one-dimensional topology network constructed by the bands in the step (1), simulating interaction and transfer processes of gas molecules between the bands by quantum walk to obtain all possible near space atmospheric evolution models;
(3) screening for actually existing evolution models in each of the bands based on stepwise regression by taking observed atmospheric density data as constraint conditions; and
(4) constructing a mapping mechanism between a plurality of near space atmospheric evolution models and atmospheric density parameter values to achieve simulation and optimization of near space atmospheric states; which realizes working time setting and reconnaissance range control for a space vehicle.

Further, the step (1) is implemented as follows:
based on an idea of space division, the near space atmospheric states are discretized with certain longitude, latitude and time resolution and organized to form a space-time cube of the near space atmospheric states; wherein the atmospheric state parameters of each space-time cube cell are expressed by the mean value of satellite observation data in the cell.

Further, the step (2) is implemented as follows:
dynamic characteristics of the quantum walk are controlled by a Hamiltonian matrix H, and the Hamiltonian matrix H is determined by a topological structure of a walk network and usually expressed as an adjacent matrix, which is abstracted as a one-dimensional topology network, with the Hamiltonian matrix expressed as:

$$H = \begin{bmatrix} 0 & 1 & 0 & \cdots & 0 & 0 \\ 1 & 0 & 1 & \cdots & 0 & 0 \\ 0 & 1 & 0 & \cdots & 0 & 0 \\ \vdots & \vdots & \vdots & \ddots & \vdots & \vdots \\ 0 & 0 & 0 & \cdots & 1 & 0 \end{bmatrix} \quad (1)$$

in the quantum walk, for a given quantum walk parameter $k_m$ (m=1, 2, . . . , M), a time evolution operator is expressed as:

$$U(t,k_m) = e^{-iHk_m t} \quad (2)$$

by expressing the state of a walker at an initial time as $\lambda(0)$, and incorporating the time evolution operator, the state of the walker at a time t can be expressed as:

$$\lambda(t,k_m) = U(t,k_m)\lambda(0) \quad (3)$$

wherein $\lambda(t,k_m)$ is a wave function representing the probability amplitude of the walker at any node at the time t; the state of the walker is represented as:

$$\lambda(t,k_m) = e^{-iHk_m t}\lambda(0) \quad (4)$$

therefore, a quantum walk parameter set $\{k_m\}_{m=1}^M$ is constructed, and the quantum walk is performed under the parameter set, so that a series of wave functions can be generated; moreover, the wave functions represent near space atmospheric evolution models with different intensities so as to reflect complex structural characteristics of the near space atmosphere.

Further, the step (3) is implemented as follows:
by taking a stepwise regression subset screening method as a screening method for near space atmospheric evolution models, and under constraints of actually observed time series of near space atmospheric state parameters Dens(t), stepwise regression subset screening is performed on all possible atmospheric evolution models generated ($\lambda(t,k_1)$, $\lambda(t,k_2)$, . . . , $\lambda(t,k_M)$), and can be expressed as:

$$\text{Dens}(t) \square \text{stepwise}\{\lambda(t,k_m)\}_{m=1}^M \quad (5)$$

all possible atmospheric evolution models ($\lambda(t,k_1)$, $\lambda(t, k_2)$, . . . , $\Delta(t,k_M)$) are screened by the stepwise regression subset screening method expressed in equation (5) based on the Akaike information criterion (AIC) to obtain model screening results, which are recorded as $\{\lambda(t,k_{n_1}), \lambda(t,k_{n_2}), \ldots, \lambda(t,k_{n_N})\}$, and $\{k_{n_1}, k_{n_2}, \ldots, k_{n_N}\} \subseteq \{k_1, k_2, \ldots, k_M\}$, wherein N represents the number of the atmospheric evolution models obtained by screening, and n represents the serial number of the atmospheric evolution models obtained by screening in all the possible atmospheric evolution models.

Further, the step (4) is implemented as follows:
based on actually existing evolution models obtained by screening in the step (3) $\{\lambda(t,k_{n_1}), \lambda(t,k_{n_2}), \ldots, \lambda(t,k_{n_N})\}$, a mapping conversion relationship between the time series of the near space atmospheric parameters and the atmospheric evolution models is established and expressed as:

$$Dens(t) = \sum_{m=1}^{N} \{\alpha(m) \times \lambda(t, k_{n_m})\} + \varepsilon(t) \quad (6)$$

wherein N represents the number of components obtained by screening; Dens(t) represents actual time series of near space atmospheric parameters; $\alpha(m)$ and $\varepsilon(t)$ represent mapping parameters, and $k_{n_m}$ represents the parameter of the components obtained by screening, and is an important characterization parameter of a dynamic evolution process of the near space atmosphere.

Based on the same inventive concept, the present invention also provides a near space atmospheric state simulation device based on the quantum walk, which comprises a memory, a processor, and a computer program stored on the memory and capable of running in the processor, wherein the computer program implements the near space atmospheric state simulation method based on the quantum walk when being loaded to the processor.

Beneficial effects: compared with the prior art, the present invention has the following beneficial effects. Most of the traditional atmospheric model methods are used for simulating atmospheric parameters based on the ideas of numerical approximation and data assimilation, and have problems such as complexity of parameters, lack of consideration of geographical region differences, and difficulty in describing irregular structures of the near space atmosphere. In the present invention, the regional differences of the near space atmospheric states are taken into account, and it is considered that the atmospheric states result from the interaction and dynamic evolution between different blocks, and the dynamic evolution process of the atmosphere is described in a probability form. Therefore, a near space atmospheric state simulation model based on the quantum walk is constructed, and in the model, a near space atmosphere is divided into atmospheric bands according to latitude, and the atmospheric evolution models between the bands are described by quantum walk, then a prediction equation between the atmospheric evolution models and the atmospheric parameters is established based on a small amount of satellite observation data, so that simulation and optimization of the atmospheric states are achieved. The simulation results based on atmospheric density data observed by a TIMED satellite in July 2012 show that the present invention can achieve higher simulation accuracy and can effectively reveal complex structural characteristics such as gradual/abrupt changes and partition/stratification in the near space atmosphere. The present invention can provide method support for generating continuous data observation fields based on sparse satellite observation data, and provides an idea for modeling in the near space from a non-deterministic perspective.

DETAILED DESCRIPTION

The present invention will be further described in detail below with reference to the drawings.

Figure 1:
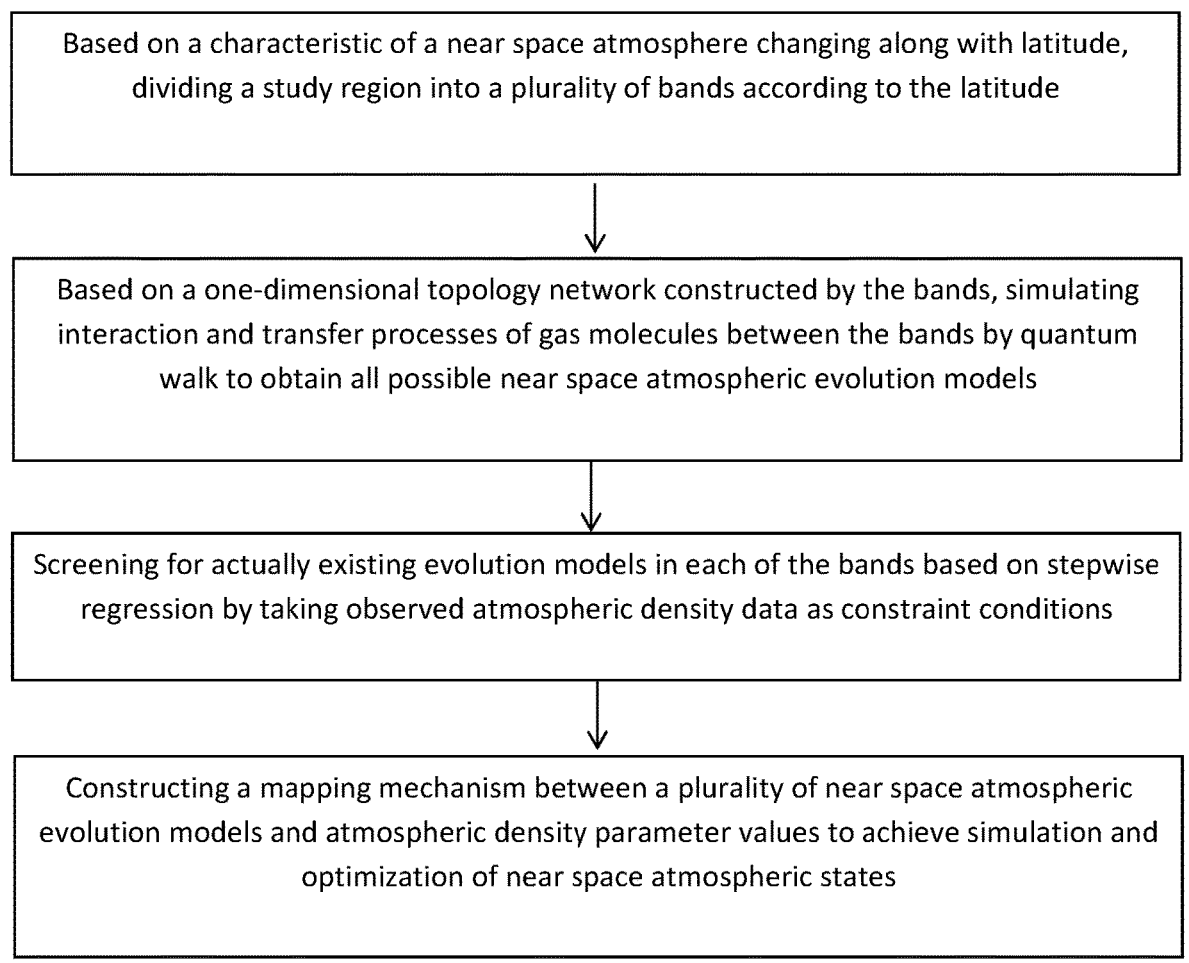
FIG. 1 is a flowchart of the present invention.

Based on quantum mechanics, atmospheric science and other related theoretical methods, the present invention provides a near space atmospheric state simulation method based on the quantum walk, which specifically comprises the following steps as shown in FIG. 1:

Step 1: based on a characteristic of a near space atmosphere changing along with latitude, dividing a study region into a plurality of bands according to the latitude.

In the present invention, the regional differences of the near space atmospheric states are taken into account, and it is considered that the near space atmospheric states result from the interaction and dynamic evolution of the upper atmosphere between different blocks, and the near space atmospheric evolution models are described in a probability form. Therefore, based on an idea of space division, the near space atmospheric state is discretized with certain longitude, latitude, and time resolution and organized to form a space-time cube of the near space atmospheric states. The atmospheric state parameters of each space-time cube cell are expressed by the mean value of satellite observation data in the cell, so that the database of the present invention is constructed.

Taking the near space atmospheric density observed by a TIMED (thermosphere ionosphere mesosphere energetics and dynamics) satellite in July 2012 as an example, the space resolution is set to 1°×1°×10 km, and the time resolution is set to 6 hours, so that a four-dimensional space-time cube with a dimension of 360×180×10×124 is constructed. Since the observation data are extremely sparse, the mean null rate of the space-time cube is as high as 99.73%, and almost all of the space-time cube cells cannot be organized into a continuous atmospheric density time series. To this end, the space resolution of the space-time cube is increased stepwise, and the study region is finally divided into 25 bands with a latitude resolution of 4°, and not divided by longitude. The study period is divided with a time resolution of 6 hours, the near spaces near the altitude of 20 km and 100 km are discretized into two space-time cube slices and processed to obtain a continuous atmospheric density time series on each slice unit.

Step 2: based on a one-dimensional topology network constructed by the bands in step 1, simulating interaction and transfer processes of gas molecules between the bands by quantum walk to obtain all possible near space atmospheric evolution models.

The near space atmosphere is influenced by a combination of physicochemical processes such as atmospheric dynamics, radiation, and photochemical processes, so that strong diffusion and interaction exist between gas molecules, and variables (such as temperature and density) of the near space atmosphere are represented as a continuous evolution process in a certain space-time range. This continuous evolution process results from the superposition of a plurality of atmospheric evolution models with different intensities among the space-time cube cells. Ideally, each space-time cube cell can be considered to have the same or similar series of atmospheric evolution models. Therefore, under constraints of a space-time cube topology constructed in step 1, the quantum walk is performed by different step sizes (parameters), and a series of ideal atmospheric evolution models with different intensities are generated, which not only helps to reveal the superposition coupling relationship between the near space atmospheric state and the series of atmospheric evolution models, but also provides a basis for establishing a high-precision and strong-robustness near space atmospheric state simulation model.

Dynamic characteristics of the quantum walk are controlled by a Hamiltonian matrix H, and the Hamiltonian matrix H is determined by a topological structure of a walk network and is usually represented as an adjacent matrix. For a single space-time cube slice in step 1, it can be abstracted as a one-dimensional topology network, and its Hamiltonian matrix can be expressed as:

$$H = \begin{bmatrix} 0 & 1 & 0 & \ldots & 0 & 0 \\ 1 & 0 & 1 & \ldots & 0 & 0 \\ 0 & 1 & 0 & \ldots & 0 & 0 \\ \vdots & \vdots & \vdots & \ddots & \vdots & \vdots \\ 0 & 0 & 0 & \ldots & 1 & 0 \end{bmatrix} \quad (1)$$

in the quantum walk, for a given quantum walk parameter $k_m$ (m=1, 2, ..., M), a time evolution operator can be expressed as:

$$U(t, k_m) = e^{-iHk_m t} \quad (2)$$

if the state of a walker at an initial time is expressed as $\lambda(0)$, and the time evolution operator is incorporated, the state of the walker at a time t can be expressed as:

$$\lambda(t, k_m) = U(t, k_m)\lambda(0) \quad (3)$$

wherein $\lambda(t, k_m)$ is a wave function representing the probability amplitude of the walker at any node at the time t. By combining equations (2) and (3), the state of the walker can be further expressed as:

$$\lambda(t, k_m) = e^{-iHk_m t}\lambda(0) \quad (4)$$

Therefore, a quantum walk parameter set $\{k_m\}_{m=1}^{M}$ is constructed, and the quantum walk is performed under the parameter set, so that a series of wave functions can be generated. Moreover, the wave functions represent near space atmospheric evolution models with different intensities so as to reflect complex structural characteristics of the near space atmosphere.

Step 3: screening for actually existing evolution models in each of the bands based on stepwise regression by taking observed atmospheric density data as constraint conditions.

Although the atmospheric states are structurally complex and have different modes because the near space atmosphere is influenced by a plurality of factors, objective constraints such as human intervention and differences in influencing factors make it impossible for part of ideal evolution models impossible to exist in the near space atmosphere. All possible atmospheric evolution models generated in step 2 are only a general set, which is a "base" for the simulation of the near space atmosphere and can only describe the dynamic evolution process of the ideal near space atmosphere. Therefore, under constraints of satellite observation data, the actual evolution models in each space-time cube cell are obtained through analysis based on specific screening criteria for near space atmospheric evolution models, so that the subsequent exploration of the superposition coupling relationship between the near space atmospheric states and a plurality of evolution models is facilitated.

In the present invention, by taking a stepwise regression subset screening method as a screening method for near space atmospheric evolution models, and under constraints of actually observed time series of near space atmospheric state parameters Dens(t), stepwise regression subset screening is performed on all possible atmospheric evolution models generated in step 2 ($\lambda(t,k_1)$, $\lambda(t,k_2)$, ..., $\Delta(t,k_M)$), and can be expressed as:

$$\text{Dens}(t) \square \text{stepwise}\{\lambda(t,k_m)\}_{m=1}^{M} \quad (6)$$

All possible atmospheric evolution models ($\lambda(t,k_1)$, $\lambda(t,k_2)$, ..., $\lambda(t,k_M)$) are screened by the stepwise regression subset screening method expressed in equation (5) based on the Akaike information criterion (AIC) to obtain model screening results, which are recorded as $\{\lambda(t,k_{m_1})$, $\lambda(t,k_{m_2})$, ..., $\lambda(t,k_{n_N})\}$, and $\{k_{n_1}, k_{n_2}, ..., k_{n_N}\} \subseteq \{k_1, k_2, ..., k_M\}$, wherein N represents the number of the atmospheric evolution models obtained by screening, and n represents the serial number of the atmospheric evolution models obtained by screening in all the possible atmospheric evolution models.

Step 4: constructing a mapping mechanism between a plurality of near space atmospheric evolution models and atmospheric density parameter values to achieve simulation and optimization of near space atmosphere states.

A plurality of atmospheric evolution models in each space-time cube cell obtained by screening in step 3 are the probability distribution of dynamic changes obtained by solving the wave function, and a mapping conversion mechanism between the near space atmospheric states and the plurality of evolution models is constructed by using a multiple linear regression model, so that the simulation and optimization of the near space atmospheric state are achieved.

Based on the atmospheric evolution models obtained by screening in step 3 $\{\lambda(t,k_{n_1})$, $\lambda(t,k_{n_2})$, ..., $\lambda(t,k_{n_N})\}$, a mapping conversion relationship between the time series of the near space atmospheric parameters and the atmospheric evolution models is established and expressed as:

$$\text{Dens}(t) = \sum_{m=1}^{N}\{\alpha(m) \times \lambda(t, k_{n_m})\} + \varepsilon(t) \quad (5)$$

wherein N represents the number of components obtained by screening in step 3; Dens(t) represents the actual time series of near space atmospheric parameters, $\varepsilon(t)$ represent mapping parameters, and $k_{n_m}$ represents the parameter of the components obtained by screening, and is an important characterization parameter of a dynamic evolution process of the near space atmosphere.

Based on the simulation and tuning results, the working time setting and reconnaissance range control of the near space vehicle are realized.

Based on the same inventive concept, the present invention also provides a near space atmospheric state simulation device based on quantum walk, which comprises a memory, a processor and a computer program stored on the memory and capable of running in the processor, wherein the computer program implements the near space atmospheric state simulation method based on the quantum walk when being loaded to the processor.

The experimental configuration of the present invention mainly comprises the following parts: (1) basic experimental configuration: a TIMED (thermosphere ionosphere mesosphere energetics and dynamics) satellite is a U.S. scientific satellite that was launched on Dec. 7, 2001, and began acquiring observation data with its payload SABER (sounding of the atmosphere using broadband emission radiometry) on Jan. 22, 2002. Since SABER needs to change the direction of limb detection every 60 days, its latitude coverage shifts between (52° S, 83°N) and (83°S, 52°N). In addition, the near space in the altitude range of 20-100 km is influenced by the space environment, atmospheric activity, and various physicochemical processes, so the atmospheric parameters in this range have complex space-time characteristics. For the above two reasons, the region with longitude from −52° to 52°, latitude from −180° to 180°, and altitude from near 20 km to near 100 km is selected as the experimental region in this study. The time range is from Jul. 1, 2012 to Jul. 31, 2012. (2) Evaluation index configuration: a coefficient of determination (R2) is selected to evaluate the modeling performance in the present invention.

Based on the above experimental configurations, the results of the present invention are divided into the following two parts: (1) a modeling result of the near space atmospheric state simulation method based on the quantum walk; and (2) a comparison of simulation accuracy of bands.

Some studies have shown that at the same altitude, the density of the upper atmosphere is greatly influenced by latitude, and less influenced by longitude, which is negligible. In the present invention, the study region is divided into 25 bands with a latitude resolution of 4°, and not divided by longitude. Moreover, the study period is divided with a time resolution of 6 hours, and the mean value of the observed densities of each period as the density value of the band. Finally, the atmospheric density time series with a length of 124 on each of the bands is obtained, which is the input data of the present invention.

In the generation of the atmospheric evolution models, 2000 times of quantum walk is performed on a one-dimensional topology network constructed based on near space bands, with the quantum walk parameter k increasing from 0.01 to 20 at an interval of 0.01. Meanwhile, a coefficient of determination (R2) is selected to evaluate the simulation effect of the model.

Figure 2:
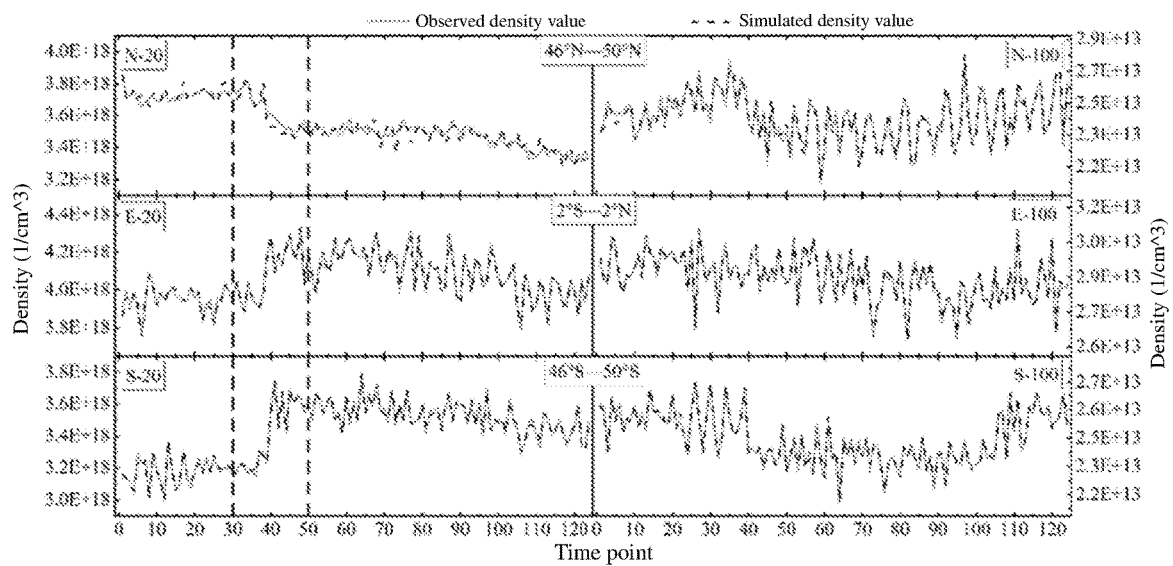
FIG. 2 is a graph showing the comparison of simulation results and actually observed data in different regions.

The simulation results of the present invention are shown in FIG. 2 (taking six sub-regions within the study region as an example). Except for the N-20 region, the model of the present invention can better simulate the changing trend of the density of the near space atmosphere. Although the fluctuation of the density of the near space atmosphere in the N-20 region is relatively flat during the study period, it is the result of the co-evolution of many complex atmospheric evolution models. The sparse observation data limit the approximation of the model of the present invention to the real evolution process, resulting in a slight decrease in modeling accuracy in the N-20 region. This is also the main reason why the simulation results for the northern hemisphere are also slightly worse than those for the equatorial region and the southern hemisphere. In addition, accurate capture of the drastic fluctuation of atmospheric density caused by the abnormal event is also a great advantage of the model of the present invention. For example, many intense solar events occurred between Jul. 7, 2012, and Jul. 18, 2012, resulting in a great change in atmospheric density within the study region at an altitude of 20 km (time points 30 to 50), and this intense fluctuation was captured by the model of the present invention. The above simulation results prove that the model of the present invention has excellent inversion capability on complex fluctuations of atmospheric density and multi-scale structures of the near space in different space-time ranges. (Note: N-20 represents a sub-region with a longitude from 46°N to 50° N and an altitude of 20 $k_m$; E-20 represents a sub-region with a longitude from 2°S to 2°N and altitude of 20 $k_m$; S-100 represents a sub-region with longitude from 46°N to −50° N and altitude of 100 $k_m$; and so on.)

Figure 3:
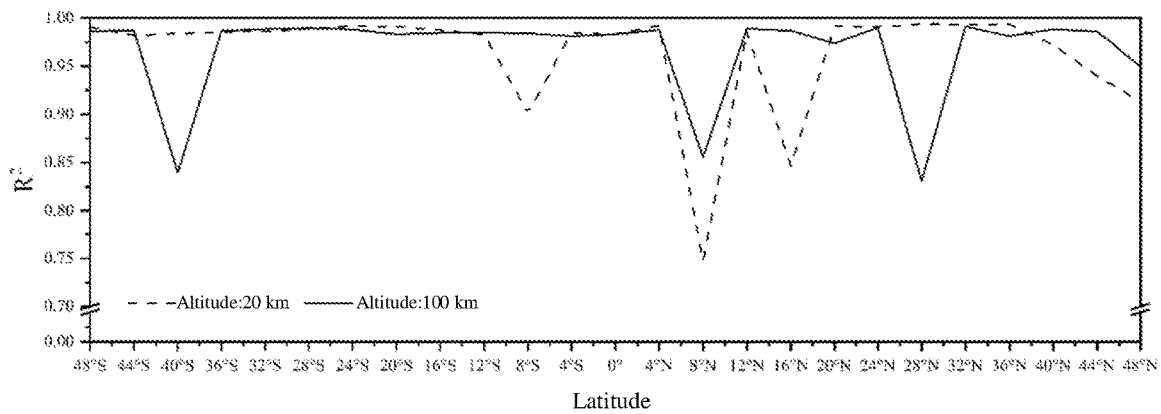
FIG. 3 is a graph showing the simulation accuracy for all bands.

The simulation accuracy for all bands is shown in FIG. 3. Overall, the model has a high modeling accuracy (0.75-0.99) and is able to invert the complex fluctuating structure of atmospheric density in different regions. In particular, the modeling accuracy at the altitude of 100 km fluctuates less and is more stable. This is probably due to the fact that at a higher altitude, the atmospheric fluctuations are relatively moderate, and thus the evolution models are stable and easy to extract. Locally, three significant troughs in the modeling accuracy were observed both at the altitude of 20 km and at the altitude of 100 km. Four of the troughs occur in the low and middle latitude areas in the northern hemisphere, suggesting that the model of the present invention is slightly less capable of capturing complex fluctuations in atmospheric density in the northern hemisphere than in the southern hemisphere. This is probably due to the fact that the direct point of the sun in July 2012 was located in a region from 10°N to 20° N, where the atmospheric temperature was higher, and the interaction between gas molecules was stronger, forming complex atmospheric evolution models. However, the extremely sparse observation data can only reflect some significant atmospheric evolution models, which makes it difficult for the model of the present invention to approximate the real evolution process, and thus the modeling accuracy is slightly reduced.

What is claimed is:

1. A near space atmospheric state simulation method based on quantum walk for reflecting a dynamic evolution process of a near space atmosphere, comprising the following steps:
(i) based on a characteristic of the near space atmosphere changing along with latitude, dividing a study region into a plurality of bands according to the latitude;
(ii) based on a one-dimensional topology network constructed by the bands in the step (i), simulating interaction and transfer processes of gas molecules between the bands by quantum walk to obtain all possible near space atmospheric evolution models;
(iii) screening for actually existing evolution models in each of the bands based on stepwise regression by taking observed atmospheric density data as constraint conditions; and
(iv) constructing a mapping mechanism between a plurality of near space atmospheric evolution models and atmospheric density parameter values to achieve simulation and optimization of near space atmospheric states, which realizes working time setting and reconnaissance range control for a space vehicle in the near space atmosphere.

2. The near space atmospheric state simulation method based on quantum walk according to claim 1, wherein the step (i) is implemented as follows:
based on an idea of space division, the near space atmospheric states are discretized with certain longitude, latitude and time resolution and organized to form a space-time cube of the near space atmospheric states; wherein the atmospheric state parameters of each space-time cube cell are expressed by the mean value of satellite observation data in the cell.

3. The near space atmospheric state simulation method based on quantum walk according to claim 1, wherein the step (ii) is implemented as follows:
dynamic characteristics of the quantum walk are controlled by a Hamiltonian matrix H, and the Hamiltonian matrix H is determined by a topological structure of a walk network and usually expressed as an adjacent matrix, which is abstracted as a one-dimensional topology network, with the Hamiltonian matrix expressed as:

$$H = \begin{bmatrix} 0 & 1 & 0 & \cdots & 0 & 0 \\ 1 & 0 & 1 & \cdots & 0 & 0 \\ 0 & 1 & 0 & \cdots & 0 & 0 \\ \vdots & \vdots & \vdots & \ddots & \vdots & \vdots \\ 0 & 0 & 0 & \cdots & 1 & 0 \end{bmatrix} \quad (1)$$

in the quantum walk, for a given quantum walk parameter $k_m$ (m=1, 2, . . . , M), a time evolution operator is expressed as:

$$U(t,k_m) = e^{-iHk_m t} \quad (2)$$

by expressing the state of a walker at an initial time as $\lambda(0)$, and incorporating the time evolution operator, the state of the walker at a time t can be expressed as:

$$\lambda(t,k_m) = U(t,k_m)\lambda(0) \quad (3)$$

wherein $\lambda(t,k_m)$ is a wave function representing the probability amplitude of the walker at any node at the time t; the state of the walker is represented as:

$$\lambda(t,k_m) = e^{-iHk_m t}\lambda(0) \quad (4)$$

therefore, a quantum walk parameter set $\{k_m\}_{m=1}^{M}$ is constructed, and the quantum walk is performed under the parameter set, so that a series of wave functions can be generated; moreover, the wave functions represent near space atmospheric evolution models with different intensities so as to reflect complex structural characteristics of the near space atmosphere.

4. The near space atmospheric state simulation method based on quantum walk according to claim 1, wherein the step (iii) is implemented as follows:
by taking a stepwise regression subset screening method as a screening method for near space atmospheric evolution models, and under constraints of actually observed time series of near space atmospheric state parameters Dens(t), stepwise regression subset screening is performed on all possible atmospheric evolution models generated ($\lambda(t,k_1)$, $\lambda(t,k_2)$, ..., $\lambda(t,k_M)$), and can be expressed as:

$$\text{Dens}(t) \square \text{stepwise}\{\lambda(t,k_m)\}_{m=1}^{M} \tag{5}$$

all possible atmospheric evolution models ($\lambda(t,k_1)$, $\lambda(t,k_2)$, ..., $\lambda(t,k_M)$) are screened by the stepwise regression subset screening method expressed in equation (5) based on the Akaike information criterion (AIC) to obtain model screening results, which are recorded as $\{\lambda(t,k_{n_1}), \lambda(t,k_{n_2}), \ldots, \lambda(t,k_{n_N})\}$, and $\{k_{n_1}, k_{n_2}, \ldots, k_{n_N}\} \subseteq \{k_1, k_2, \ldots, k_M\}$, wherein N represents the number of the atmospheric evolution models obtained by screening, and n represents the serial number of the atmospheric evolution models obtained by screening in all the possible atmospheric evolution models.

5. The near space atmospheric state simulation method based on quantum walk according to claim 1, wherein the step (iv) is implemented as follows:

based on actually existing evolution models obtained by screening in the step (iii) $\{\lambda(t,k_{n_1}), \lambda(t,k_{n_2}), \ldots, \lambda(t,k_{n_M})\}$, a mapping conversion relationship between the time series of the near space atmospheric parameters and the atmospheric evolution models is established and expressed as:

$$\text{Dens}(t) = \sum_{m=1}^{N} \{\alpha(m) \times \lambda(t, k_{n_m})\} + \varepsilon(t) \tag{6}$$

wherein N represents the number of components obtained by screening; Dens(t) represents actual time series of near space atmospheric parameters; $\alpha(m)$ and $\varepsilon(t)$ represent mapping parameters, and $k_{n_m}$ represents the parameter of the components obtained by screening, and is an important characterization parameter of a dynamic evolution process of the near space atmosphere.

6. A near space atmospheric state simulation device based on the quantum walk, comprising a memory, a processor, and a computer program stored on the memory and capable of running in the processor, wherein the computer program implements the near space atmospheric state simulation method based on quantum walk according to claim 1 when being loaded to the processor.

* * * * *